United States Patent [19]
Langenfeld

[11] 3,992,705
[45] Nov. 16, 1976

[54] REMOTE ADDING AND READING DEVICE FOR A METER

[75] Inventor: Michel Langenfeld, Vandoeuvre-les-Nancy, France

[73] Assignee: Pont-A-Mousson S.A., Nancy, France

[22] Filed: June 10, 1975

[21] Appl. No.: 585,722

[30] Foreign Application Priority Data
June 12, 1974 France .............................. 74.20363

[52] U.S. Cl. ................................ 340/203; 340/178
[51] Int. Cl.² ........................................... G08C 19/16
[58] Field of Search ................. 340/203, 188 R, 198

[56] References Cited
UNITED STATES PATENTS

| | | | |
|---|---|---|---|
| 3,388,388 | 6/1968 | Brown | 340/203 |
| 3,636,517 | 1/1972 | Stoten | 340/203 |
| 3,662,366 | 5/1972 | Neuville | 340/203 |

Primary Examiner—Thomas B. Habecker
Attorney, Agent, or Firm—Sughrue, Rothwell, Mion, Zinn & Macpeak

[57] ABSTRACT

A remote adding and reading device useful in reading a utility meter is disclosed. The device includes a main totalizing register having a first decade counter adapted to be driven by the measuring device of the meter and an auxiliary totalizing register having a second reversible decade counter respectively contained in two distinct cases. The case containing the auxiliary totalizing register is removable, and the auxiliary totalizing register is driven by the main totalizing register through a contactless drive. Reading is accomplished by means of a portable apparatus which plugs into the case containing the auxiliary totalizing register. The portable apparatus causes the second decade counter to be reset to zero and, in the process, the quantity accumulated by the auxiliary totalizing register since the preceding reading is read out.

5 Claims, 3 Drawing Figures

REMOTE ADDING AND READING DEVICE FOR A METER

The feature of the device is that the general adder and the device for reading at a distance are contained separately in two distinct cases, the second case being removable and the partial adder being driven by the general adder through contactless drive means.

The invention is advantageous in water, gas or electricity meters.

The present invention relates to a remote adding and reading device, that is a device for adding and reading at a distance, for a meter and in particular a water, gas or electricity meter of the type comprising a main totalizing register having a first decade counter intended to be driven by the measuring device of the meter and a remote reading device comprising an auxiliary totalizing register having a reversible second decade counter driven, on one hand, by the main totalizing register and, on the other, and in the opposite direction and temporarily, by a zero setting means electrically connected to a remote reader. The latter therefore records upon each temporary reading effected by the actuation of said zero-setting means the last partial total read off.

In known devices of this type the auxiliary totalizing register is driven by the main totalizing register through a differential and the whole of the device, apart from the remote reader, is contained in a single case.

Now, such an arrangement requires the disassembly and consequently the putting out of action of the whole of the device whenever a single one of its parts is defective. Moreover, it precludes any utilisation for water meters having an adder immersed in the water.

An object of the invention is to overcome these drawbacks and to provide a device of the aforementioned type wherein the main totalizing register and the remote reading device are separately contained in two distinct cases, the second case being detachable and the auxiliary totalizing register is driven by the main totalizing register through contactless drive means.

It is thus possible to assemble and disassemble the remote reading device or to carry out on this device an exchange of component parts or repairs of a fault without having to put out of action or disturb the main totalizing register. It is also possible to employ the device for a meter having a main totalizing register immersed in the water. Moreover, the cost of the meter without the remote reading device is practically identical to that of a normal meter which does not allow the addition of such a device.

In an advantageous embodiment of the invention the contactless drive means is constituted by a magnetic drive means. The latter is of particularly simple design and easily uncoupled.

Further features and advantages of the invention will be apparent from the ensuing description given merely by way of example with reference to the accompanying drawing in which.

Figure 1:
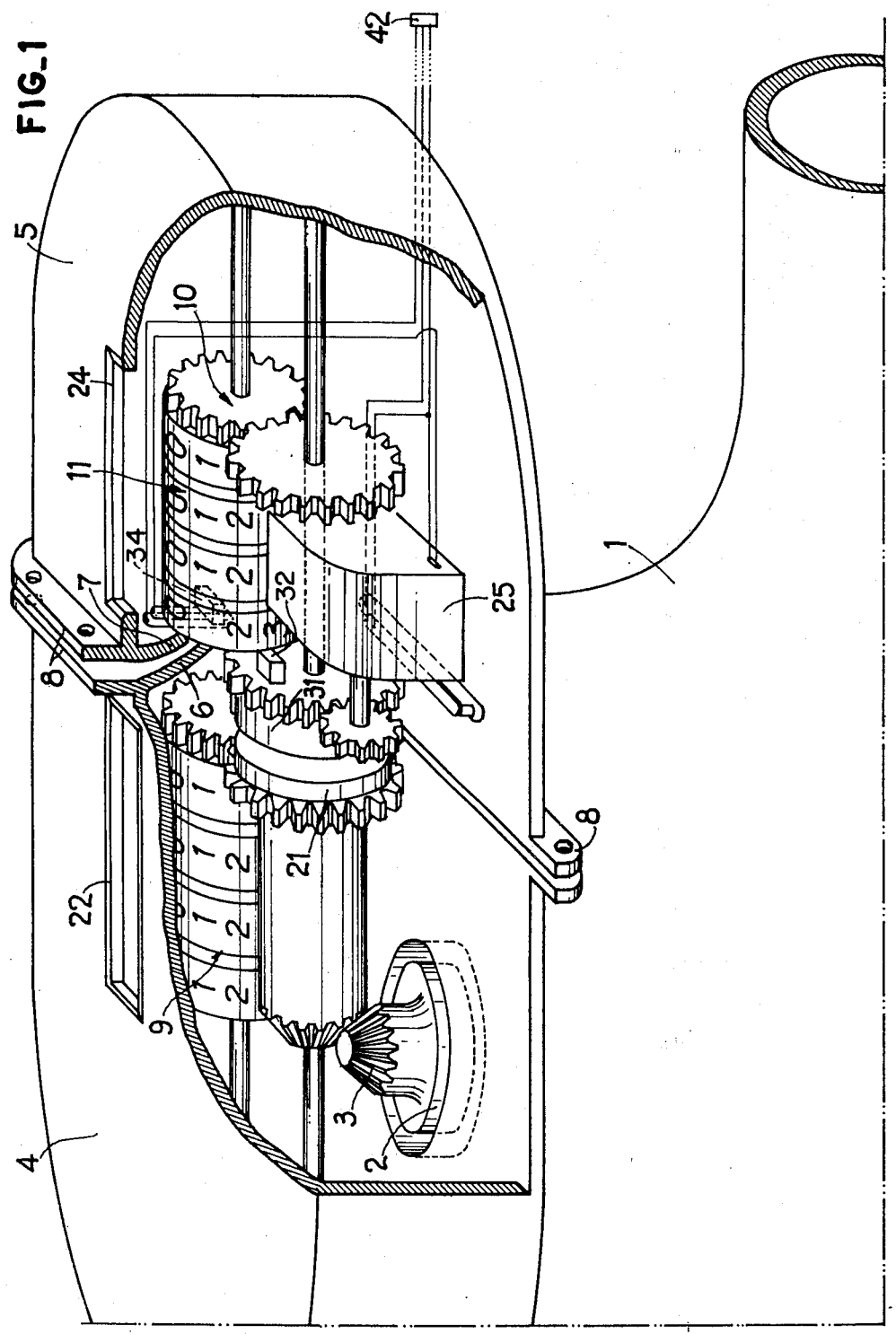
FIG. 1 is a perspective view, with parts cut away, of a device according to the invention.
Figure 2:
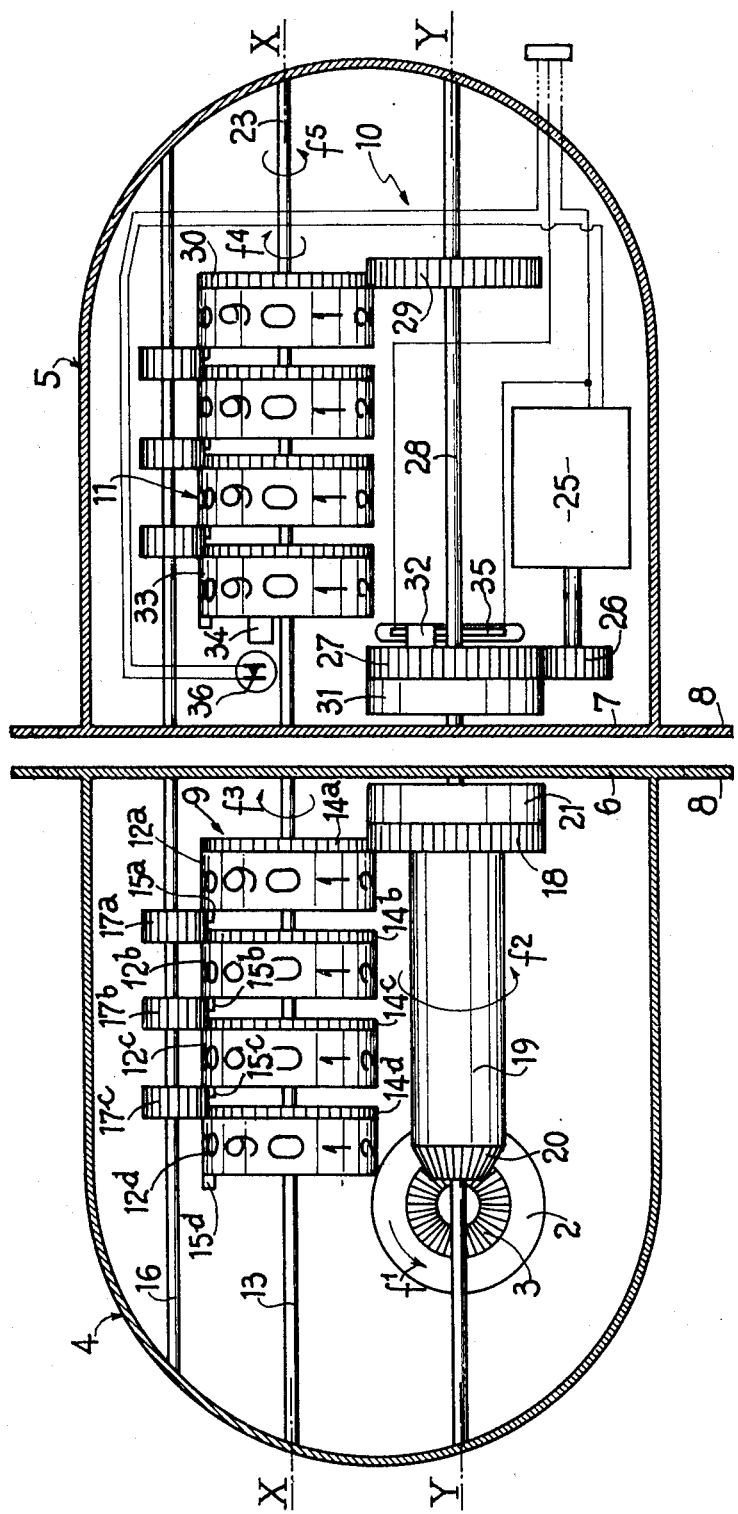
FIG. 2 is a plan view of this device, the upper walls of the cases having been removed.

The device is mounted on the body 1 of a water meter comprising means for measuring the flow of water which is not shown but which comprises a vertical output shaft 2 having at its upper end portion which extends out of the body a bevel gear 3. Disposed above the body 1 of the meter are two cases 4 and 5 which comprise horizontal and parallel upper and lower walls and are juxtaposed along two vertical planar walls 6 and 7 including fixing flanges 8. At the opposite ends of the cases to the two walls 6 and 7 the cases have semicylindrical end walls. The case 4 is disposed directly above the body 1 of the meter and the end of the shaft 2 extends into this case through its lower wall. The case 5 is disposed directly on the side of the case 4 and secured thereto by the flanges 8.

The case 4 encloses a main totalizing register 9 and the case 5 a remote reading device 10 comprising an auxiliary totalizing register 11.

The main totalizing register 9 comprises a first decade counter having four indicator drums $12a$ to $12d$ which are rotatably mounted, with a certain spacing therebetween, on a common horizontal shaft 13 which is secured to the case 4 and has an axis X—Y offset from the shaft 2. These drums are graduated from 0 to 9 and each carry on their faces facing in the same direction gears $14a$ to $14d$ whereas on their outer faces they carry an axially projecting toothed sector having two teeth $15a$ and $15d$, this sector being disposed in the region of the figure 8 on each drum. The case 4 carries a shaft 16 which is parallel to the shaft 13 and on which there are rotatably mounted three gears $17a$ to $17c$ termed connecting gears, these gears being interposed between the drums $12a$ to $12d$ so as to mesh both with the toothed sector of one of the drums and with the following gear. The ratios of the gears 14 and 17 are such that the rotation caused by the passage on the gear 17 of the sector 15 of the preceding drum causes the following drum to rotate through one graduation. The gear $14a$ also meshes with a gear 18 fixed to a horizontal rotary shaft 19 whose axis Y—Y is parallel to axis X—X and intersects the axis of the shaft 2. The shaft 19 defines a bevel gear 20 which meshes with the bevel gear 3 of the shaft 2. The shafts 13, 16 and 19 are mounted to be perpendicular to the wall 6 of the case 4 and the gear 18 faces this wall 6. Between the gear 18 and the wall 6, the shaft 19 carries a cylindrical magnet 21 which is placed at a very short distance from the wall 6. The outer wall of the case 4 has a window 22 located above the upper generatrix of the drums $12a$ to $12d$.

The auxiliary totalizing register 11 contained in the case 5 is of a structure absolutely identical to that of the auxiliary totalizing register 9 and comprises a reversible second decade counter having its drums are mounted in the same way on a shaft 23 in alignment with the shaft 13 on the axis X—X. A window 24 is formed in the upper wall of the case above the upper generatrix of these drums. Apart from this adder this remote reading device comprises a motor 25 whose output shaft is disposed parallel to the axis Y—Y but offset from the latter, this shaft carrying a gear 26 which meshes with a gear 27 fixed on a shaft 28 which is rotatably mounted on the case 5 and has an axis Y—Y. This shaft 28 carries another gear 29 which meshes with the gear 30 integral with the first drum of the adder 11, the gears 27 and 29 having teeth identical to those of the gear 30. The gear 27 faces the wall 7 and between this gear and wall 7 the shaft 28 carries another cylindrical magnet 31 identical to the magnet 21 and spaced a very short distance from the wall 7 so as to be exactly in facing relation to the first magnet 21. On the opposite face of the magnet 31 the gear 27 carries on its periphery and on a small portion of its circumference a small magnet 32. Likewise, the last drum 33 of the adder 11 carries in axially projecting relation and on the side opposed to the other drums, a small magnet 34 similar to the magnet 32 and disposed in the region of the graduation or figure 9 of this drum. Two switches having a flexible strip 35 and 36 are fixed to the case so as to be in the vicinity of the respective paths of the magnets 32 and 34, the position of the switch 36 being such that it is opened by the magnet 34 at the moment when the figure 9 of the drum 33 appears in the window 24.

Figure 3:
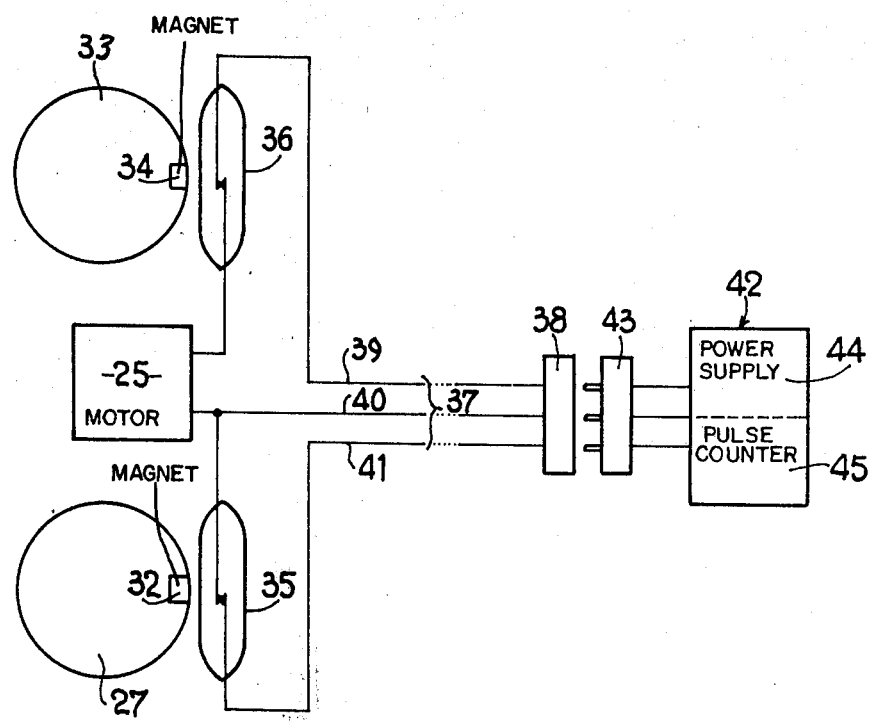
FIG. 3 is an electric diagram of the device.

The motor 25 is of such type that the force necessary for driving it when under no load is low. As shown in FIG. 3, this motor 25 is connected by an electric cable 37 issuing from the case 5 to a female connector or socket 38 which may be located at a distance from the meter. The cable 37 has three conductors. Two conductors 39 and 40 connect two sleeves of the socket to the motor 25, the first through the switch 36 and the third conductor 41 connects the third sleeve of the socket to a branch connection with the conductor 40 through a second switch 35. The remote reading device 10 comprises, also at a distance from the case 5, an apparatus, for example a portable apparatus 42, which may be connected to the socket 38 through a male connector or plug 43 and which comprises a voltage generator 44 that the plugs are capable of connecting to the conductors 39 and 40 and an electronic pulse counter or meter 45 which the connectors are capable of connecting to the conductors 40, 41.

The device just described operates in the following manner:

Outside the periods of the reading of the indications of the meter, the plug 43 is not engaged in the socket 38 and consequently none of the conductors 39, 40 and 41 carries current and the motor 25 is inoperative. The shaft 2 is driven in rotation in the direction of arrow $f^1$ by the measuring means of the meter and itself drives in rotation the shaft 19 in the direction of arrow $f^2$. The shaft 19 rotates the gear 14a and the drum 12a through the gear 18 in the direction of arrow $f^3$. Each one of the drums 12b to 12d advances through one graduation for each complete revolution of the preceding drum and it is consequently possible to read on the four drums through the window 22 the amount of water consumed.

Moreover, the shaft 19 rotates the magnet 21 and the latter also drives by magnetic attraction the magnet 31 facing it. The magnet 31 drives in the direction of arrow $f^4$, which is the same direction as the arrow $f^3$, the drums of the auxiliary totalizing register 11 through the gear 29 and the gear of the drum 30. The gear 27, connected to rotate with the magnet 31, also drives the gear 26 of the motor but this drive has not inconvenience since the motor is carrying no voltage and the torque required for driving it under no load is low. It is possible to read on the four drums of the auxiliary totalizing register 11 through the window 24 the amount of water consumed since the last reading.

In order to carry out a reading of the indications of the meter, the plug 43 of the portable apparatus 42 is plugged into the socket 38 so that the motor 25 carries current, bearing in mind that the switch 26 is closed, this switch being opened only under a particular condition which will be indicated hereinafter. Thus supplied, the motor 25 drives in rotation the drums of the auxiliary totalizing register 11 in the direction of arrow $f^5$ which is the opposite direction to that of the arrow $f^4$ employed during the metering, through the gear 26 and the gears 27 and 29. This rotation is permitted by the fact that the torque of the motor 25 is sufficient to free the magnet 31 from the attraction of the magnet 21, the latter remaining fixed owing to the very high resistant torque created by the measuring means of the meter. During the rotation of the gear 27, the magnet 32 carried by the latter passes for each revolution in front of the switch having a strip 35 which at each time opens the switch. The number of openings of the switch is counted at a distance by the meter 45 of the portable apparatus 42 to which the pulses are transmitted through the return conductor 41 and the socket 38 and plug 43. The number thus counted corresponds to the number of revolutions effected by the gear 27 which is also the number effected by the first drum 30 of the adder. This drum and the following drum thus rotate in the direction opposed to the direction of rotation existing outside the periods of the reading, which constitutes a zero setting of the auxiliary totalizing register 11. At the end of this zero setting, when the figure 9 of the last drum 33 appears in the window 24, the magnet 34 carried by this drum comes into facing relation with the switch 36 and thus opens the latter and cuts off the supply to the motor 25 which then stops. This cutting off only occurs when the drums of the adder have their figure 0 in front of the window 25 and have a tendency to continue to rotate in the direction in which the figure 9 of these drums would appear in the window. The reading operation is then finished.

With the motor 25 stopped, the magnet 31 is once more driven in rotation by the magnet 21 which then once more rotates the drums of the auxiliary totalizing register 11 in the direction of arrow $f^4$. As soon as this rotation is resumed, the figures 0 of all the drums reappear first in the window 24. Moreover, the switch 36 is no longer subjected to the effect of the magnet 34 and this would permit a new supply of current to the motor upon a subsequent reading.

This device has the following advantages among others:

Owing to the utilisation of two distinct cases and of a contactless drive means, it is possible to employ a meter provided with a general adder to which it is possible to adapt if desired a remote reading device since it is sufficient to add to the case 4 containing the general adder a case 5 including the remote reading device. The interconnection of the cases may be carried out as indicated hereinbefore by bolted flanges, but other fixing means for the cases may be employed.

This also has the advantage that the cost of the meter without the remote reading device is identical to that of a meter normally employed which does not permit the addition of a remote reading device.

It is also thus possible to achieve any intervention, such as the disassembly or an exchange of a component part or repairs of a fault in this remote reading device without disturbing the main totalizing register.

The construction of the contactless drive means in the form of magnetic means permits the driving of the remote reading device without a mechanical connection while allowing the uncoupling of this drive. The uncoupling device employed is particularly simple and introduces no additional mechanical member, such as for example a differential.

As the motor is not controlled by pulses as in certain known devices, it is capable of rotating at high speeds, for example several thousand r.p.m., owing to the fact that the pulses sent out by the switch 35 are counted by an electronic counter whose measuring frequencies are also very high, whence a very appreciable saving in the reading time.

Having now described my invention what I claim as new and desire to secure by Letters Patent is:

1. In a remote meter reading system comprising a main totalizing register having a first decade counter for connection to measuring means of a meter to be driven by the measuring means and accumulate a first unit total, and a device for taking a reading of the meter at a station remote from the meter, the device comprising an auxiliary totalizing register having a reversible second decade counter for accumulating a second unit total by unit in accordance with unit increase in the first unit total, resetting means combined with the second decade counter for producing a decrease in the second unit total unit by unit and resetting the second decade counter to zero unit total, means for actuating the resetting means from said station, counting means for counting the number of units by which the second unit total is decreased to reach said zero; the improvement comprising a first case completely enclosing the main totalizing register, a second case completely enclosing the auxiliary totalizing register, means for separably connecting the second case to the first case, transmission means for drivingly connecting the first decade counter to the second decade counter so that unit increase in the first unit total results in corresponding unit increase in the second unit total, the transmission means comprising a first magnet connected to be driven with the driving of the first decade counter and disposed in the first case and a second magnet connected to rotate the second decade counter and disposed in the second case, the first magnet being capable of driving the second magnet when the two cases are interconnected, the transmission means being capable of allowing the second decade counter to be driven in reverse by the resetting means without affecting the first counter.

2. A system as claimed in claim 1, wherein the second decade counter comprises drums and a third magnet disposed on the last drum of the second decade counter which is reset to zero by the resetting means and there is provided a switch having a flexible strip which is cooperative with the third magnet to open the switch when said last drum reaches its zero position, said switch being combined with the actuating means to stop actuation of the resetting means when the second decade counter reaches zero unit total.

3. A system as claimed in claim 1, wherein the second decade counter comprises drums, and the counting means comprise a third magnet, means for driving the third magnet in rotation in synchronism with the first drum of the second decade counter which is reset to zero by the resetting means, a switch having a flexible strip which is cooperative with the third magnet to actuate the switch upon each full rotation of the first drum, and a pulse counter connected to be actuated by the switch.

4. A system as claimed in claim 3, comprising a fourth magnet disposed on the last drum of the second decade counter which is reset to zero by the resetting means and a second switch having a flexible strip which is cooperative with the fourth magnet to open the switch when said last drum reaches its zero position, said second switch being combined with the actuating means to stop actuation of the resetting means when the second decade counter reaches zero unit total.

5. In a remote meter reading system comprising a main totalizing register having a first decade counter for connection to measuring means of a meter to be driven by the measuring means and accumulate a first unit total, and a device for taking a reading of the meter at a station remote from the meter, the device comprising an auxiliary totalizing register having a reversible second decade counter for accumulating a second unit total unit by unit in accordance with unit increase in the first unit total, resetting means combined with the second decade counter for producing a decrease in the second unit total unit by unit and resetting the second decade counter to zero unit total, means for actuating the resetting means from said station, counting means for counting the number of units by which the second unit total is decreased to reach said zero; the improvement comprising a first case completely enclosing the main totalizing register, a second case completely enclosing the auxiliary totalizing register, means for separably connecting the second case to the first case, transmission means for drivingly connecting the first decade counter to the second decade counter so that unit increase in the first unit total results in corresponding unit increase in the second unit total, the transmission means comprising releasable coupling means having one coupling part mounted in the first case and a second coupling part mounted in the second case and permitting a ready separation of the second case from the first case, the transmission means being capable of allowing the second decade counter to be driven in reverse by the resetting means without affecting the first counter.

* * * * *